United States Patent
Schuler et al.

(10) Patent No.: US 6,917,700 B2
(45) Date of Patent: Jul. 12, 2005

(54) METHOD AND APPARATUS FOR THE DETERMINATION OF THE CONTOUR OF SHEET METAL BLANKS

(75) Inventors: Heinrich Schuler, Aachen (DE); Udo Mattes, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 615 days.

(21) Appl. No.: 09/888,006

(22) Filed: Jun. 22, 2001

(65) Prior Publication Data

US 2002/0033885 A1 Mar. 21, 2002

Related U.S. Application Data

(60) Provisional application No. 60/213,784, filed on Jun. 23, 2000.

(51) Int. Cl.$^7$ .................................................. G06K 9/00
(52) U.S. Cl. .................................... 382/152; 356/240.1
(58) Field of Search ............................... 382/141, 152; 348/207.1; 702/34, 35; 356/237.1, 240.1; 73/37.5, 592, 598, 865.8; 700/175, 176

(56) References Cited

U.S. PATENT DOCUMENTS 4,729,423 A * 3/1988 Martin ........................ 165/11.1
5,642,293 A * 6/1997 Manthey et al. ............... 702/42

OTHER PUBLICATIONS

"A Data Reduction Algorithm for Planar Curves" by James Roberge Computer Vision, Graphics, and Image Processing 29, 168–195 (1985).

"Multi–Scale Curvatures for Contour Feature Extraction" by Koichiro Deguchi, IEEE Computer Society Order No. 878.

"Efficient Polygon Approximation of Planar Curves" by M.A.Wani and B.G.Batchelor, SPIE vol. 1823 (1992) pp. 140–150.

"Curvilinear Feature Detection from Curvature Estimation" by Lawrence O=Gorman, IEEE 1988.

"Setmentierung von Konturen auf der Basis von Krummungsberechnungen" by Monika Lange.

* cited by examiner

Primary Examiner—Samir Ahmed
(74) Attorney, Agent, or Firm—Dykema Gossett PLLC; Carlos Hanze

(57) ABSTRACT

A certain percentage of sheet metal blanks (20) for cars are not bounded by straight cuts. These so-called contour blanks are cut by form dies to optimize material usage of sheet metal coils. During the tryout process of the press tools the final contour for the blanks is determined in an iterative process. The manually size-optimized blank contour has to be digitized for blank nesting and the construction of a form die to cut the blank from the coil in production. The present invention discloses a low-cost measurement system based on a digital camera (21). This camera allows taking pictures of blanks (20) on-site in the plant and process them off-line to regenerate geometrical information by use of photogrammetric principles. This method yields a significant reduction of lead-time by eliminating the need for a slow coordinate measuring machine (CMM).

14 Claims, 4 Drawing Sheets

METHOD AND APPARATUS FOR THE DETERMINATION OF THE CONTOUR OF SHEET METAL BLANKS

This application claims benefit of Provisional No. 60/213,784, filed Jun. 23, 2000.

FIELD OF THE INVENTION

This invention relates to a photogrammetry method and apparatus. In particular, the invention relates to a method and apparatus for the determination of the contour of sheet metal blanks.

BACKGROUND OF THE INVENTION

For an average passenger car about 250 different blanks are needed. The blanks have to be cut of sheet metal coils. De-pending on the shape complexity, this can be done by swivel-mounted shears for angular straight cuts, adjustable dies with variable pitch for parallel cuts, or by form dies for blanks with a complicated contour. By use of form dies and appropriate nesting on the coil material usage can be minimized. However, tooling costs increase and are not justified for simple shapes. Typically 50–70 of the total 250 parts will be cut by form dies.

In principle, the blank follows the binder contour of the press tool as it was designed by die systems engineering. However, material flow rate is not equally distributed along the binder due to dynamic effects, material properties and process parameters. Lock beads may be inserted to avoid folds and to influence material hardness. Therefore, the binder geometry is insufficient to determine the shape of the form dies for blank cutting. Although soft tooling experiments and FEM computations can help in predicting the blank contour, only tool tryout will deliver conclusive results.

During the blank engineering process for a new car line, the manually optimized shape has to be digitized for tool construction and blank nesting. Since the sheet metal is two-dimensional the digitization task is not complicated in terms of technology used. The critical factor is time needed to digitize the 50–70 parts that require form dies. In the state of the art, the following techniques are used for this task:

coordinate measuring machine (CMM), paper copy and digitization device, and paper copy and manual measurement (re-engineering).

These techniques are inherently slow. The accuracy of CMMs is higher than adequate for this task. Since they are not provided for such relatively low precision work they will often not be available. Even so, the 3D point data of a CMM has to be converted into a preferred CAD format. The start point of the two other methods is a paper copy of the blank. The out-line of the blank is simply transferred by a pencil on a large sheet of paper. In a second step a drawing table with a built-in electronic digitization device can be used. Points on the contour can be picked and digitized by pressing a trigger button. Again, this data has to be converted into the preferred CAD drawing format. As an alternative, the paper sketch of the blank can be used for part re-engineering. Part dimensions can be measured by hand on paper and are then keyed in a 2D drawing program to reconstruct the blank.

Equipment such as drawing tables has disappeared with the introduction of CAD and closed-loop CAD/CAM environments and is only available through external services. The access to external suppliers will additionally slow down the process.

Taking the mentioned drawbacks of current state of the art into account, the objective of the present invention was to achieve cost reductions and an improved timing in the production of sheet metals for cars.

SUMMARY OF THE INVENTION

This objective is achieved by methods according to claims 1 and 8 and an apparatus according to claim 14. Preferred embodiments are subject of the dependent claims.

The method according to the present invention allows the determination of the contour of substantially planar workpieces and comprises the following steps:

a) preparing the workpiece and possibly the workpiece support by applying a plurality of length scales and/or position-markers that are spread out over the surface of the workpiece and/or its support;

b) taking at least two overlapping photographs of the prepared workpiece from various perspectives with a digital camera;

c) photogrammetrical processing of the photographs with a data processing unit for producing a true-to-scale overall image of the workpiece, and d) determining the contour of the workpiece from the true-to-scale overall image produced in step c).

The cited method relies on the use of a digital camera for data acquisition and the use of photogrammetry for the processing of these data. For the preferred application of this method, in which the workpieces are metal blanks for cars, considerable savings in time and material can be achieved by time savings for digitization of hand optimized blank contours, and improved blank nesting.

The underground of the workpiece during the taking of the photos is preferably dark (or even black) in comparison to the workpiece. This guarantees a high contrast between background and workpiece and helps to determine the contour.

In order to increase contrast between background and workpiece and to avoid impairing reflections, the workpiece may be coated with a contrasting layer before taking the photos. The workpiece may e.g. be sprayed with a matt paint.

The position-markers and rulers that are arranged on the support of the workpiece during the photography are preferably disposed on equalizing or compensation layers having a thickness corresponding to the thickness of the workpiece. Thus, they are in the same vertical height as the markers and rulers on the workpiece, which allows a more precise determination and reproduction of their position and measures in the photos. Moreover, weights may be positioned on the workpiece in order to press it flat on the ground.

According to a preferred embodiment of the invention, at least two photos of a workpiece are taken from perspectives that are substantially orthogonal to each other. Such photographs allow for a most precise reproduction of measures and positions of the workpiece during photogrammetry.

The photos of the workpiece may be rectified. This means that the image plane and the workpiece plane are transformed onto each other. After rectification, the different single photos can readily be combined to form a complete picture of the whole workpiece.

The contour that is determined as a result of the proposed method is preferably defined as a polygon. Such a polygon requires a minimal amount of data and at the same time allows the approximation of a real shape with any desired precision.

Moreover, the invention concerns a method of establishing a form die for cutting out sheet metal parts, wherein in a plurality of respective steps:

a prototype of the form die is produced, a test sheet is cut out with the prototype, the contour of the test sheet is determined and compared to a reference contour, and the shape of the next prototype of the form die is adjusted on the basis of the comparison The method is characterized in that the contour of the test sheet is determined with a method described above.

Due to the easy and rapid acquisition of the contour of the blanks during this method, the considerable savings of time and material mentioned above can be achieved.

The invention also comprises an apparatus for the determination of the contour of the blanks during this method, the considerable savings of time and material mentioned above can be achieved.

The invention also comprises an apparatus for the determination of the contour of workpieces in a method explained above. With such an apparatus, the advantages of the method can be realized. The apparatus comprises:

position-markers and length scales for application to the workpiece and/or the workpiece support;

a digital camera for recording digital, electronically stored photographs of the workpiece; and a data processing unit which is adapted for photogrammetrical processing of photographs of a workpiece recorded with the digital camera, for producing a true-to-scale overall image of the workpiece therefrom and for determining the contour of the workpiece from the true-to-scale overall image.

BRIEF DESCRIPTION OF THE DRAWINGS

In the following the invention will be described exemplary with reference to the accompanying drawings in which.

DETAILED DESCRIPTION OF THE PREFERRED EMBODIMENT

In the production of sheet metal blanks for cars, a certain percentage of the blanks used in the press shops are not bounded by straight cuts. These so-called contour blanks are cut by form dies to optimize material usage of sheet metal coils. During the tryout process of the press tools the final contour for the blanks is determined in an iterative process. The manually size-optimized blank contour has to be digitized for blank nesting and the construction of a form die to cut the blank from the coil in production. According to the pre-sent invention, a low-cost measurement system based on a digital camera is proposed. It allows to take pictures of blanks on-site in the plant and to process them off-line to regenerate geometrical information by use of photogrammetric principles. This procedure provides a significant reduction of lead-time by eliminating the need for a slow coordinate measuring machine (CMM).

The primary use of photogrammetry is in the development of topographic maps using aerial photographs. Depending on the accuracy requirements and the application environment, one can distinguish three types of photogrammetric devices:

Metric cameras:

They have stable and precisely known internal geometry and very low lens distortions. Therefore, they are very expensive devices. Today, all of them have an image format of 23 by 23 centimeters and they are often used in aerial photogrammetry.

Stereometric cameras:

A stereometric camera in principle consists of two metric cameras mounted at both ends of a bar. Both photographs have viewing directions which are parallel to each other and in a right angle to the mounting base, simulating human stereoscopic vision.

"Amateur" cameras:

An "amateur camera" is a photographic device of which the internal geometry is unstable or unknown, as is the case with any "normal" commercially available camera. However, also these can be very expensive and technically highly developed. Photographing a test field with many control points, a "calibration" of the camera can be calculated. However, the precision will not reach that of metric cameras.

A photographic image is a "central perspective". This implies that every light ray which reached the film surface passed through the camera lens (which is mathematically considered as a single point, the "perspective center"). In order to take measurements of object points from photographs, the ray bundle must be reconstructed. Therefore, the internal geometry of the used camera (which is defined by the focal length, the position of the principal point and the lens distortion) has to be precisely known. The principal point is the coordinate where the axis through the perspective center hits the film or CCD plane. The focal length is called "principal distance", which is the distance of the projection center from the image plane's principal point.

Figure 1:
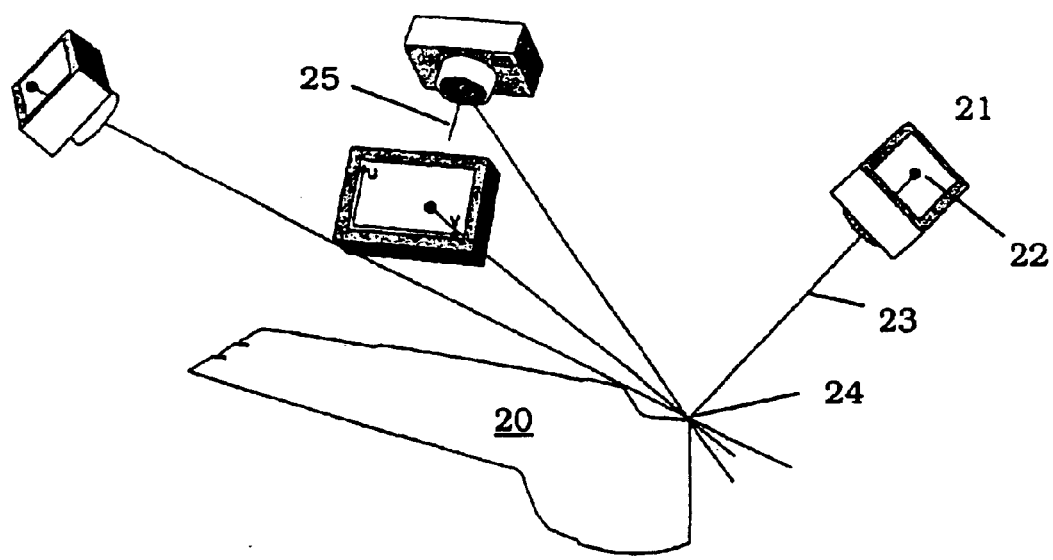
FIG. 1 shows the scheme of convergent photogrammetry.

FIG. 1 shows the taking of photographs of a metal blank 20 with a digital camera 21. By taking pictures from at least two different locations and measuring the points of interest (image points 22) in each photograph, one can develop lines of sight 23 from each camera location to the points of interest 24 on the object. The intersection of these pairs of lines of sight can then be triangulated to produce the three-dimensional coordinate of the point 24 on the object. In this way, a pair of two-dimensional measurements of the u, v positions of the point in each photograph is used to produce the single x, y, z coordinate measurement of the point on the object. In FIG. 1, the optical axis of the camera is referenced with number 25.

Unlike stereo photogrammetry, the convergent photogrammetry process does not attempt to imitate the stereoscopic viewing capabilities of the human vision system to make measurements. Instead, photographs are taken with the camera axes typically inclined towards each other (rather than parallel to each other as with the stereo method) so that the camera axes converge or intersect as shown in FIG. 1. In other words, the viewing directions of the camera must not be parallel for all pictures. One now measures easily distinct features in each photograph, e.g. corner points, and these measurements are combined together to produce the three-dimensional coordinates of the points. The convergent method is not limited to using just two photographs of an object at a time. Many photographs can be taken which leads to higher accuracy and reliability and makes it far easier to measure complex objects which cannot be completely seen in just two photographs. Using three and more photographs allows to compute coordinates with a minimum square error adjustment and to estimate errors for each point, providing a quality indication of the process.

Figure 2:
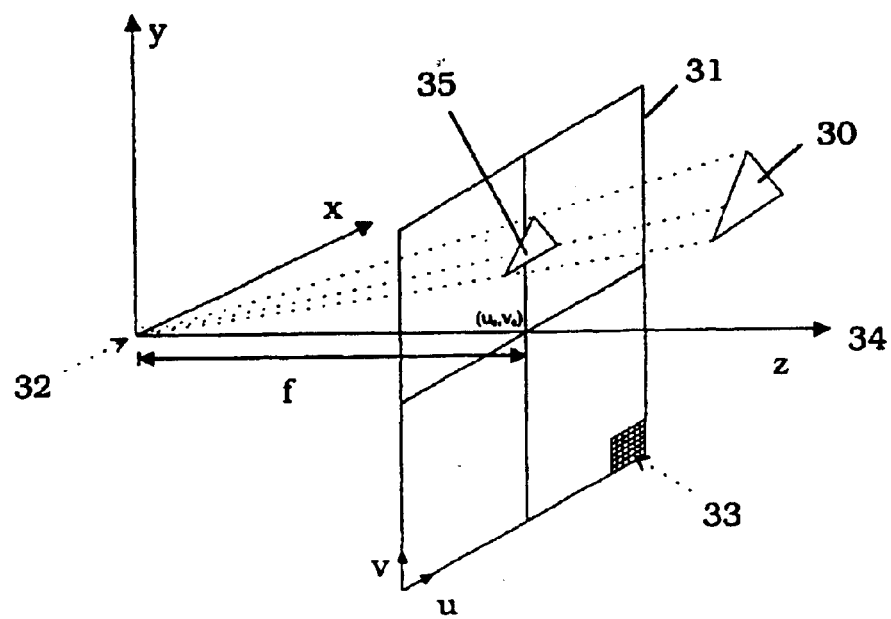
FIG. 2 illustrates the situation of pinhole projection.

The mathematics behind this process can best be explained by the simple pinhole camera model illustrated in FIG. 2. The pinhole camera model connects the 3D world point (x,y,z) with the 2D image point (u,v) by a straight line, neglecting all lens effects. A perspective projection is the projection of a three-dimensional object 30 onto a two-dimensional surface 31 (consisting of pixels 33) by straight lines that pass through a single point, the center of projection 32. Geometric relations show that given the distance f of the image plane 31 to the center of projection 32, then the image coordinates $(u_i,y_i)$ are related to the object coordinates $(x_o,y_o,z_o)$ by $$u_i = u + u_c = (f/z_o) \cdot x_o + u_c$$

and $$v_i = v + v_c = (f/z_o) \cdot y_o + v_c$$

or the object distance z expressed as scale factor s and written as a homogeneous matrix equation:

$$\begin{bmatrix} su \\ sv \\ s \end{bmatrix} = \begin{bmatrix} f & 0 & 0 \\ 0 & f & 0 \\ 0 & 0 & 1 \end{bmatrix} \cdot \begin{bmatrix} x \\ y \\ z \end{bmatrix} + \begin{bmatrix} su_c \\ sv_c \\ 0 \end{bmatrix}$$

where $(u_c,v_c)$ is the image center point and the optical axis z is assumed to pass through the image center (FIG. 2). The transformation of $(+u_c,+v_c)$ accounts for the fact that image coordinates in pixels 33 are by convention given as positive integer numbers. The pixel coordinates can be obtained from the above equation by dividing u and v by the physical pixel size of the applied image sensor. Current digital technology often uses ⅔" sensors (8.576×6.861 $mm^2$) with a pixel element size of 6.7 $\mu m^2$. In a real application the z-axis will never pass exactly through the center of the image since it is impossible to adjust lenses and the sensor with a precision of only several microns. Therefore, the true point of intersection between image sensor and optical axis, the so-called principal point, has to be determined by the camera calibration process.

The parameters pixel size, focal length and principal point are called intrinsic camera parameters since they describe the internal camera geometry and are not dependent on the position and orientation of the camera in space. As an extension to the simplified pinhole model lens distortions have to be considered in a real application as a major influence on the projection. Very often the camera model presented by Tsai is used (Tsai, R., Y.: A versatile camera calibration technique for high accuracy 3D machine vision metrology using off the self TV cameras and lenses; in: IEEE Journal of Robotics and Automation, Vol.3, No.4, 1987).

In general, the three-dimensional world coordinates of a point will not be specified in a frame whose origin is at the center of projection and whose z axis lies along the optical axis. Some more convenient coordinate frame will more likely be chosen and a general transformation matrix has to be included in the projection equations to describe the camera rotation and orientation with respect to that frame.

In order to achieve a high degree of automation, reliability and accuracy in the measuring process, one normally measures high-contrast targets placed on or near the points of interest on the object. Since the geometry of the targets is known (e.g. a circle), they can be detected in the image with so called subpixel accuracy. Interpolation techniques are used to find the center point position of the target in the images with higher resolution than offered by the camera. Therefore, target points can be detected with highest accuracy. Accuracy specifications of vendors are mostly related to the detection of target points. The coordinates of natural points of the image like edges, corners or holes can be computed with lower accuracy as targets (marked or signaled points). Corresponding natural points in different images have to be specified manually (e.g. by a mouse click). This process cannot be done with subpixel accuracy.

In the frame of the present invention, coordinates of natural points, namely edges of the hand optimized blank, have to be digitized. Marked points or targets are only used to register partially overlapping images relative to each other and to work out the transform from image to world coordinates.

One of the objectives for a blank photogrammetry system is ease of use with no delicate equipment or tedious processes. A major drawback of traditional photogrammetry was the complicated and slow film development with an additional film scanning procedure to analyze images by software on a computer. This process has been dramatically cut by the availability of digital cameras. Here, a CCD (charge coupled device) replaces the film in a standard camera housing. The electronic device captures the image in a digital form so that they can directly be transferred to a computer.

There are a couple of technical issues to consider before selecting a consumer ("amateur") digital camera for measurement purposes. An automatic fine adjustment of the focus (autofocus) will lead to erroneous camera calibration parameters and decrease measurement accuracy. A camera chip with square pixels is advantageous because it avoids differences in scaling for x and y image direction. Fixed focal length lenses of high quality are preferable and a stable mechanical housing is required.

Before use in a photogrammetry application the camera has to be calibrated. In particular, the focal length in a certain position of the zoom lens has to be known. Most photogrammetry software can include the camera parameters in the mathematical optimization which decreases the impact of miscalibration. This process is called simultaneous calibration. However, a good starting point for the camera parameters is essential to get reliable results from simultaneous calibration. In this study, a free software from the university of Oulu, Finland was used for calibration (cf. Heikkila, J., Silven, O.: Calibration procedure for short focal length off-the-shelf CCD cameras; in: Proc of The 13th International Conference on Pattern Recognition. Vienna, Austria 1996, pp. 166–170). It is a series of scripts for the MatLab computing environment and available over the internet.

Experiments with a motorized Zoom lens Consumer Camera showed that the principle point is varying when the camera is closed (zoom lens retracted). The reason for this is the backlash of the motor driven mechanics. This clearly indicates that a zoom camera is not the optimal device for measuring applications. In production, a fixed focus objective should be used. However, for the test it was possible to calibrate the camera, let it open until the final shots had been made, and include the camera parameters in the photogrammetric optimization.

In summary, new digital cameras offer the opportunity to perform geometric measurements by photogrammetry with low effort and at low cost compared to film cameras or metric cameras.

The main criteria for the selection of photogrammetric software are:

ease-of-use suitability for the task, work speed price, including software adaptations if necessary.

The first step in any photogrammetric project is to collect data in the field. This involves two main tasks: providing a network of target points to establish a reference system between the photographs and the real world, and taking the actual photographs of the project area.

Targets are needed as reference points to calculate the location and orientation of a set of photographs. Since the targets can be detected with high accuracy, they should also be used to provide distance information. The coded targets are arbitrarily placed on the blank and its surroundings. The whole image area should contain targets. As distance reference objects rulers 43 (FIG. 3) were used with targets precisely attached to it.

Figure 3:
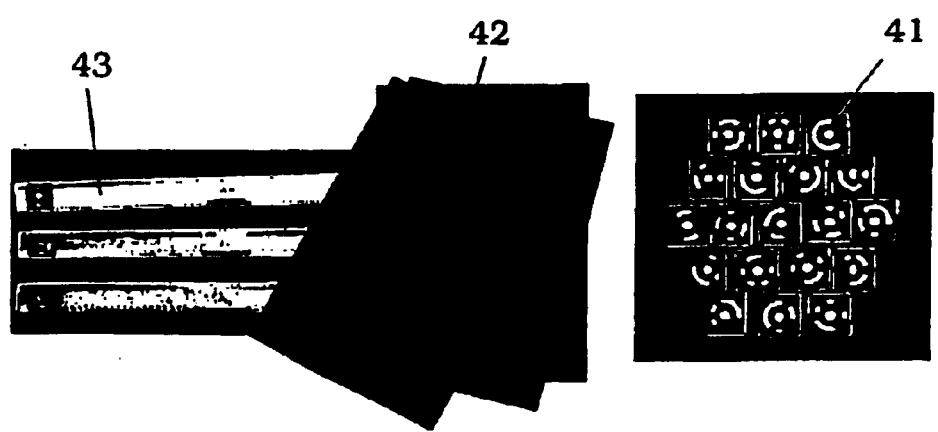
FIG. 3 shows rulers, background material and coded targets used to prepare a workpiece for photography.

The best background for the application is black paper 42 or fabric. Depending on the surface and flash conditions the sheet metal can appear as very bright (mirror-like) or dark (rust or in image corner). There can be problems to distinguish sheet metal and background if the background color is not black. Shadowing effects at the edge of the blank have no effect on the black background. All items necessary to prepare the workpieces are shown in FIG. 3: black background material 42, coded targets 41 and coded rulers 43 of known length.

For the first three images of a project a standard direction to the workpiece coordinate system is recommended (view left, view right, front view). The views from left and right should intersect at a large angle of about 90°. This procedure stabilizes the resulting equation system. The rest of the images can be taken as feasible. If the workpiece is placed on the floor one should walk around it and take pictures from all sides. Each photograph must contain a fair amount of overlap with some of the other images. This overlap will be used in the analysis phase to calculate relative orientation between images. The scale, orientation, location, etc. of the images to each other is not critical, nor is it recorded in any way in the field. For large objects, it is advisable to end the photo session with some close-ups from the top that provide a good view on a part of the blank. Two or three of these final shots will be the photos that are actually used to trace the contour. The others, in particular all long range overview image, only stabilize the coordinate information.

The process of reading the project image files, identifying corresponding points, computing relative and absolute orientation and bundle adjustment can be fully automated. After the image orientation and camera positions have been found, world coordinates can be measured. Rolleimetric CDW allows working in a plane, i.e. the coordinates are computed by intersection of the line of sight with the workpiece plane. There is no specification of identical points in multiple images necessary. The workpiece contour can be simply traced by a drawing tool. A part of the image can be magnified to work as accurate as possible. These tools are well conceived and work efficiently with a few mouse clicks. The generated polygon can be exported as DXF or ASCII point list.

Figure 4:
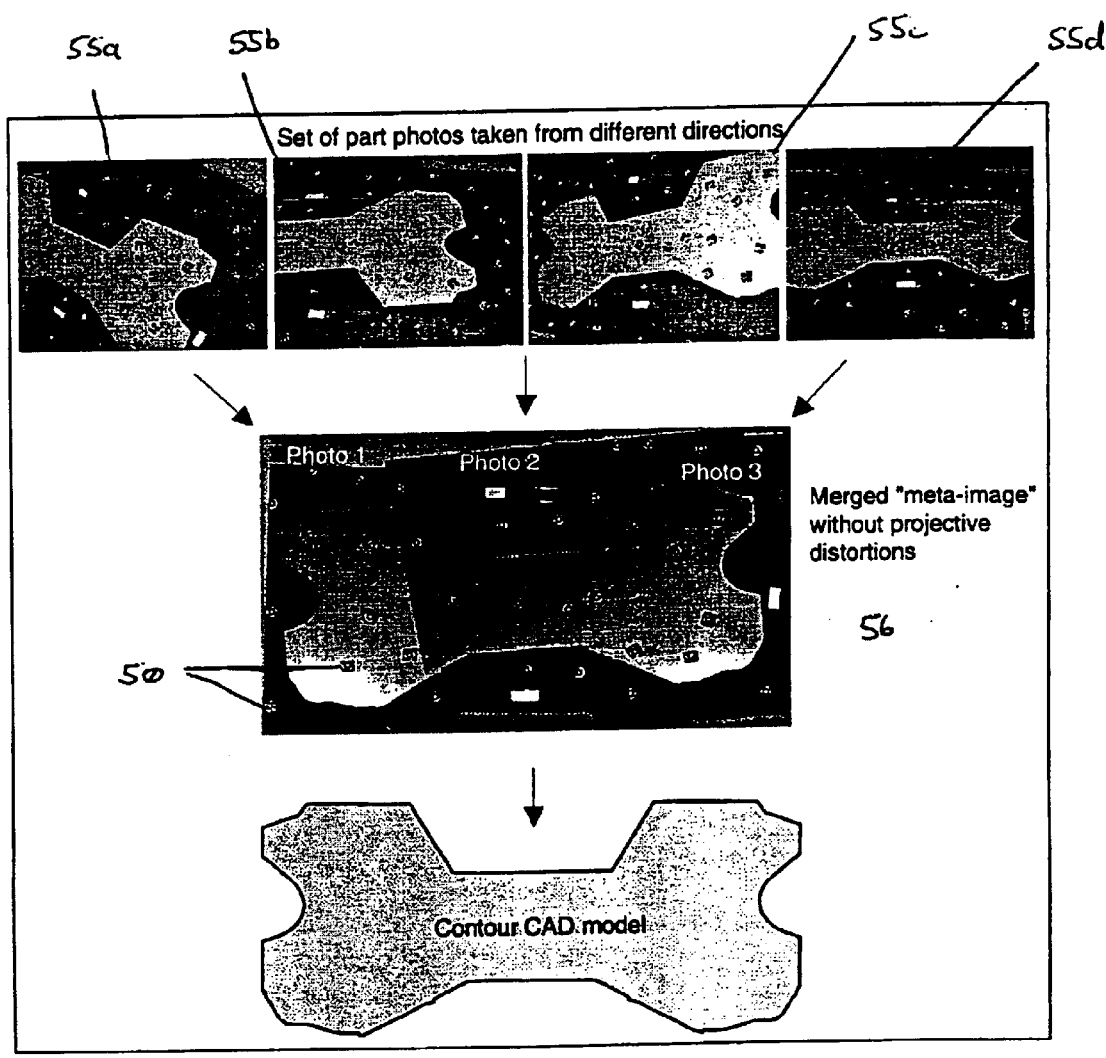
FIG. 4 illustrates the workflow from single photos of a workpiece to a CAD model.

Very often the complete workpiece contour will be patched by several pictures to increase resolution. The contour would have to be traced in several pictures and the corresponding partial polygons are not closed connected. The gaps between starting points and end points would have to be connected in a CAD system before the result can be processed by a nesting algorithm. The rectification feature can overcome this limitation. Rectification means transforming the image plane and the workpiece plane onto each other. As can be seen from FIG. 4, the image becomes like a map that is seen from above without perspective distortions. All images 55a–55d can now be stitched together to create one huge meta-image 56.

Figure 5:
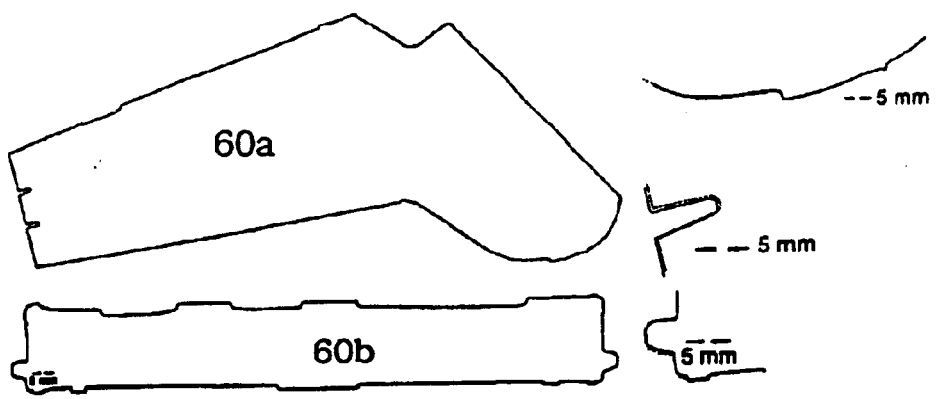
FIG. 5 illustrates the repeatability of measurements according to the present invention.

The repeatability and reproducibility of the photogrammetry approach has been analyzed by taking measurements of the same blank 60a, 60b under changed measurement conditions (FIG. 5). Between two measurements the camera has been closed, the workpiece repositioned and the rulers and targets redistributed to different locations. It can be seen from FIG. 5 that the resulting maximum deviation between two contours is well below 5 mm and generally much less.

Figure 6:
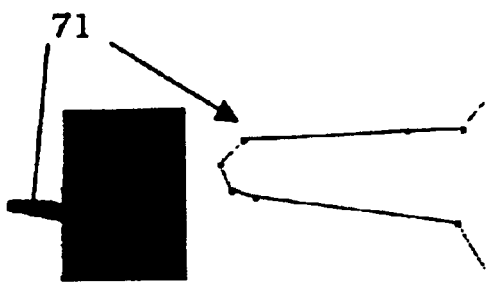
FIG. 6 illustrates a situation that reveals the limits of conventional CMM contour tracking.

All the blanks used in this test have been measured on a coordinate measuring machine to provide a reference for absolute accuracy of the photogrammetry approach. The CMM measurements have been made using a 4 mm diameter cylinder as a touch probe. This implies that details finer than 4 mm cannot be reproduced correctly. FIG. 6 shows the approximation of a rounded inside groove 71 by straight-line segments with one point in the apex. Since the groove has a width of only 9 mm the CMM cannot move the cylinder probe along the contour.

Another source of deviation between CMM and photogrammetry may be insufficient sampling density on the CMM. The CMM operator may e.g. leave out points like fine "noses" at the corners of the blank because he regards them as irrelevant for form die construction. As these structures are modeled in the photogrammetric measurement, the photo points lie outside CMM reference. In the measurement statistics these points are out of tolerance but this does not really reflect the accuracy of the method.

Figure 7:
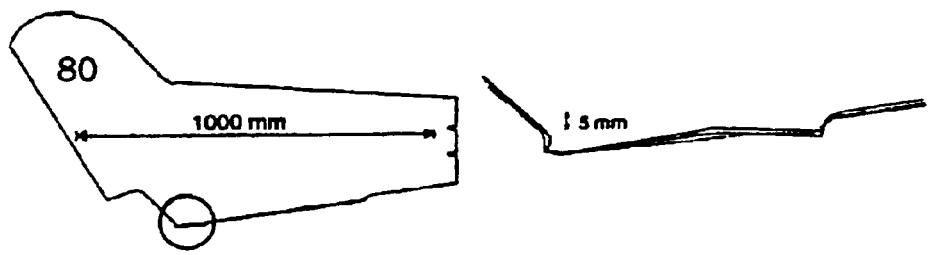
FIG. 7 illustrates the absolute accuracy of the inventive method.

Two independent photogrammetric measurements have been compared to the CMM reference measurement of a blank 80 (FIG. 7). The three contour lines have been mapped (rotated and translated) onto each other so that the resulting deviation appeared to be as small as possible. Although this method may not produce the optimum result it can be seen from FIG. 7 that the maximum error is about 5 mm for a part that is much larger than 1000 mm. The average error is obviously much smaller.

A quantitative evaluation of the deviations between CMM and photogrammetry measurements is given in the following table:

| | |
|---|---|
| maximum deviation | +3.17 mm |
| minimum deviation | −2.55 mm |
| \|max − min\| | 5.72 mm |
| standard deviation σ | 1.16 mm |
| points total | 152 |
| points in tolerance | 120 |
| points out of tolerance | 32 |

It has been verified that photogrammetry is a feasible approach to replace CMMs in the measurement of sheet metal parts. There are several sources of error to be considered. As described above some artificial outliers are caused by the different sampling strategies on CMM and photogrammetry. One systematic error is that targets on the blank and targets on the surrounding area are assumed to lie in the same plane z=0. This is not the case because of the blank material thickness. Typical blanks are 0.5 m to 2 m in length and less than 5 mm, preferably less than 2 mm thick. In order to remove the mentioned error, targets of the surrounding area may be positioned on distance or equalizing layers that compensate for the thickness differences. Finally, the zoom lens of the camera is not optimal for the application. It cannot be guaranteed that the principal point remains constant during a set of pictures due to mechanical instabilities.

The present invention proposes the use of photogrammetric techniques for fast contour digitization. The goal was to speed up the determination of blank contours after manual optimization during the tool tryout process. This task is two-dimensional in nature. A largely automated data processing allows the system to be used without specific knowledge about the underlying technology. In this context blank digitization can be looked at as a typical example of a measurement task with restrictions on floor space, part transport and measurement time.

The proposed system will cost less than 30,000. U.S.$ including hardware and software. Considering the potential savings and the flexibility for further applications this can be called low cost. The attractive price is stemming from the use of a medium priced digital camera which will limit the achievable accuracy in the range of a few millimeters. Particular preparation of the blanks such as cleaning, matting or painting is not required. A simple black background will provide enough contrast for secure detection of the blank contour.

While the invention has been particularly shown and described with reference to the preferred embodiment thereof, it is well understood by those skilled in the art that various changes and modifications can be made in the invention without departing from the spirit and the scope of the invention.

What is claimed is:

1. A method of determining the contour of a substantially flat workpiece comprising:
    applying one or more reference markers to the workpiece and to a workpiece support used in cooperation with the workpiece;
    obtaining at least two overlapping digital photographs of the workpiece from different perspectives;
    photogrammetrically processing the photographs to produce a true-to-scale overall image of the workpiece; and
    determining the contour of the workpiece from the true-to-scale overall image.

2. The method according to claim 1, wherein said step of applying the reference markers comprises the step of applying a plurality of length scales distributed over a surface of the workpiece.

3. The method according to claim 1, wherein said step of applying the reference markers comprises the step of applying a plurality of position-markers distributed over a surface of the workpiece.

4. The method according to claim 1, wherein the workpieces are sheet metal parts of an automobile.

5. The method according to claim 1, wherein the reference markers are plurality of length scales or position-markers distributed over a surface of the workpiece.

6. The method according to claim 1, wherein the workpiece support is dark in color in comparison with the workpiece.

7. The method according to claim 1, further comprising the step of applying a contrasting coating to the workpiece.

8. The method according to claim 1, wherein said step of obtaining the overlapping digital photographs comprises the steps of:
    using a digital camera to record the overlapping digital photographs, the digital camera having; and
    recording the overlapping digital photographs from perspectives with substantially mutually perpendicularly disposed optical axes of the digital camera.

9. The method according to claim 1, further comprising the step of rectifying each of the overlapping digital photographs such that image planes of the photographs and workpiece are transformed onto each other.

10. The method according to claim 1, wherein the contour of the workpiece is a polygon.

11. A method of establishing a form die for cutting sheet metal parts, comprising:
    producing a prototype of the form die;
    cutting a test sheet with the prototype form die;
    determining the contour of the test sheet using the method of claim 1;
    comparing the contour of the test sheet to a reference contour; and
    adjusting the shape of a subsequent prototype form die based on the comparison of the test sheet contour to the reference contour.

12. An apparatus for determining the contour of a substantially flat workpiece comprising:
    one or more reference markers for application to the workpiece;
    a workpiece support having at least some of said references disposed thereon;
    a digital camera for recording digital, electronically stored photographs, of the workpiece; and
    a data processing unit for photogrammetrically processing the stored photographs, for producing a true-to-scale overall image of the workpiece therefrom and for determining the contour of the workpiece from the true-to-scale overall image.

13. The apparatus according to claim 12, wherein the reference markers are position-markers.

14. The apparatus according to claim 12, wherein the reference marks length scales.

* * * * *